United States Patent
Pandya et al.

(10) Patent No.: US 9,313,085 B2
(45) Date of Patent: Apr. 12, 2016

(54) DNS-BASED DETERMINING WHETHER A DEVICE IS INSIDE A NETWORK

(75) Inventors: Raunak Pandya, Andhra Pradesh (IN); Abhishek Tiwari, Andhra Pradesh (IN); Rama Krishna Amaravadi, Andhra Pradesh (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/970,371

(22) Filed: Dec. 16, 2010

(65) Prior Publication Data

US 2012/0159636 A1 Jun. 21, 2012

(51) Int. Cl.
*H04L 29/00* (2006.01)
*H04L 29/12* (2006.01)
*H04L 29/06* (2006.01)

(52) U.S. Cl.
CPC .... *H04L 29/12066* (2013.01); *H04L 29/12811* (2013.01); *H04L 61/1511* (2013.01); *H04L 61/6009* (2013.01); *H04L 63/0823* (2013.01)

(58) Field of Classification Search
USPC ..................................... 726/26; 709/203, 245
See application file for complete search history.

(56) References Cited

U.S. PATENT DOCUMENTS

| | | | |
|---|---|---|---|
| 6,021,429 A | 2/2000 | Danknick | |
| 7,542,468 B1 | 6/2009 | Begley et al. | |
| 7,930,428 B2 * | 4/2011 | Drako | 709/245 |
| 8,949,411 B2 | 2/2015 | Tiwari et al. | |
| 2003/0097589 A1 | 5/2003 | Syvanne | |
| 2004/0017814 A1 | 1/2004 | Shimada | |
| 2005/0182937 A1 | 8/2005 | Bedi | |
| 2006/0013158 A1 | 1/2006 | Ahuja et al. | |
| 2006/0212601 A1 | 9/2006 | Hampton | |
| 2007/0055749 A1 | 3/2007 | Chien | |
| 2008/0049779 A1 | 2/2008 | Hopmann et al. | |
| 2008/0089241 A1 | 4/2008 | Lloyd et al. | |
| 2010/0036959 A1 | 2/2010 | Trace et al. | |

(Continued)

FOREIGN PATENT DOCUMENTS

| | | |
|---|---|---|
| CN | 1663222 A | 8/2005 |
| CN | 1666486 A | 9/2005 |

(Continued)

OTHER PUBLICATIONS

James, Justin, "Deploying an Application Created with the OutSystems Agile Platform", Retrieved at << http://blogs.techrepublic.com.com/programming-and-development/?p=2708 >>, Jun. 14, 2010, pp. 6.

(Continued)

*Primary Examiner* — Brandon Hoffman
*Assistant Examiner* — Michael D Anderson
(74) *Attorney, Agent, or Firm* — Timothy Churna; Kate Drakos; Micky Minhas

(57) ABSTRACT

In a computing device a domain name system (DNS) query is generated and sent, and a check is made as to whether a verified DNS response to the DNS query is received. The computing device is determined to be inside a particular network if a verified DNS response is received, and is determined to be outside that particular network if a verified DNS response is not received. A DNS response can be determined to be verified if both the DNS response has an expected value and the DNS response is digitally signed by a trusted authority, and otherwise can be determined to be not verified.

31 Claims, 5 Drawing Sheets

(56) References Cited

U.S. PATENT DOCUMENTS

| | | | |
|---|---|---|---|
| 2010/0107240 A1 | 4/2010 | Thaler et al. | |
| 2010/0186079 A1* | 7/2010 | Nice et al. | 726/14 |
| 2011/0145316 A1* | 6/2011 | Ait-Ameur et al. | 709/203 |
| 2012/0158944 A1 | 6/2012 | Tiwari et al. | |

FOREIGN PATENT DOCUMENTS

| | | |
|---|---|---|
| CN | 1922834 A | 2/2007 |
| CN | 101179491 | 5/2008 |
| WO | 0130043 A2 | 4/2001 |

OTHER PUBLICATIONS

Shane, "Force Login Except Special IP Range WordPress Plugin", Retrieved at << http://www.bestwpthemez.com/wordpress/force-login-except-special-ip-range-wordpress-plugin-5098/ >>, Dec. 29, 2009, pp. 9.

Nancy, et al., "RBIDS-IDS with Biometric Authentication and Trace Back Scheme for Enhanced Security", Retrieved at << http://www.ijcaonline.org/journal/number3/pxc387186.pdf >>, International Journal of Computer Applications, vol. 1 No. 3, 2010, p. 35-39.

"Class IpAddressCondition", Retrieved at << http://docs.amazonwebservices.com/AWSJavaSDK/latest/javadoc/com/amazonaws/auth/policy/conditions/IpAddressCondition.html >>, Retrieved Date: Oct. 15, 2010, pp. 2.

"Branch Deployment of ISA Server 2004 Enterprise Edition", Retrieved at << http://technet.microsoft.com/en-us/library/cc302510(printer).aspx >>, Retrieved Date: Oct. 13, 2010, pp. 25.

Arends, et al., "DNS Security Introduction and Requirements", Retrieved at << http://tools.ietf.org/pdf/rfc4033.pdf >>, Mar. 2005, pp. 1-21.

Arends, et al., "Resource Records for the DNS Security Extensions", Retrieved at << http://tools.ietf.org/pdf/rfc4034.pdf >>, Mar. 2005, pp. 1-29.

Arends, et al., "Protocol Modifications for the DNS Security Extensions", Retrieved at << http://tools.ietf.org/pdf/rfc4035.pdf >>, Mar. 2005, pp. 1-53.

Mockapetris, P., "Domain Names—Concepts and Facilities", Retrieved at << http://www.ietf.org/rfc/rfc1034.txt >>, Nov. 1987, pp. 1-55.

Mockapetris, P., "Domain Names—Implementation and Specification", Retrieved at << http://tools.ietf.org/pdf/rfc1035.pdf >>, Nov. 1987, pp. 1-55.

Sseshad., "DNSSEC on Windows 7 DNS client", Retrieved at << http://blogs.technet.com/b/sseshad/archive/2008/11/11/dnssec-on-windows-7-dns-client.aspx >>, Nov. 11. 2008, pp. 2.

Atkins, et al., "Threat Analysis of the Domain Name System (DNS)", Retrieved at << http://tools.ietf.org/html/rfc3833 >>, Aug. 2004, pp. 1-33.

Davies, Joseph., "The Name Resolution Policy Table", Retrieved at << http://technet.microsoft.com/en-us/magazine/ff394369.aspx >>, Feb. 2010, pp. 5.

Shinder, Deb., "Getting to Know the Windows Server 2008 R2 Name Resolution Policy Table (NRPT)", Retrieved at << http://www.windowsnetworking.com/articles_tutorials/Getting-Know-Windows-Server-2008-R2-Name-Resolution-Policy-Table-NRPT.html >>, Feb. 18, 2010, pp. 1-15.

Sorce, et al., "A DNS RR for IP based Location Discovery (Draft)", Retrieved at << http://www.freeipa.org/page/DNS_Location_Discovery >>, Retrieved Date: Oct. 12, 2010, pp. 1-6.

"Discover DNSSEC", Retrieved at << http://www.verisign.com/domain-name-services/domain-information-center/dnssec-resource-center/overview/index.html >>, Retrieved Date: Oct. 12, 2010, pp. 2.

"Non-Final Office Action", U.S. Appl. No. 12/970,298, (Aug. 29, 2012), 12 pages.

"PCT Search Report and Written Opinion", Application No. PCT/US2011/065277, (Aug. 28, 2012), 9 pages.

"Foreign Office Action", CN Application No. 201110423043.7, Jul. 14, 2014, 15 Pages.

"Notice of Allowance", U.S. Appl. No. 12/970,298, Sep. 16, 2014, 6 pages.

"Foreign Office Action", Chinese Application No. 201110423043.7, Oct. 31, 2013, 11 pages.

"Non-Final Office Action", U.S. Appl. No. 12/970,298, (Jul. 3, 2013), 16 pages.

"Final Office Action", U.S. Appl. No. 12/970,298, Apr. 23, 2014, 12 pages.

"Foreign Office Action", CN Application No. 201110423043.7, Jan. 20, 2015, 10 pages.

"Foreign Office Action", CN Application No. 201110423099.2, Jan. 4, 2015, 14 pages.

"Foreign Office Action", CN Application No. 201110423043.7, Aug. 3, 2015, 8 Pages.

"Foreign Notice of Allowance", CN Application No. 201110423043.7, Oct. 22, 2015, 4 Pages.

* cited by examiner

DNS-BASED DETERMINING WHETHER A DEVICE IS INSIDE A NETWORK

BACKGROUND

Many computing devices are mobile devices that can be easily transported to different locations. These mobile devices can sometimes operate in different manners based on whether they are considered to be inside a particular network. However, it can be difficult to reliably determine when a mobile device is inside a particular network at any particular time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a domain name system (DNS) query is generated and caused to be sent. A check is made as to whether a verified DNS response to the DNS query is received. A computing device is determined to be inside a particular network if a verified DNS response is received, and is determined to be outside that particular network if a verified DNS response is not received.

In accordance with one or more aspects, a domain name system (DNS) response to a DNS query is received. Checks are made as to whether the DNS response has an expected value and whether the DNS response is digitally signed by a trusted authority. The computing device is determined to be verified and inside a particular network if both the DNS response has the expected value and the DNS response is digitally signed by the trusted authority, and the computing device is otherwise determined to be unverified and outside that particular network.

BRIEF DESCRIPTION OF THE DRAWINGS

The same numbers are used throughout the drawings to reference like features.

DETAILED DESCRIPTION

Figure 1:
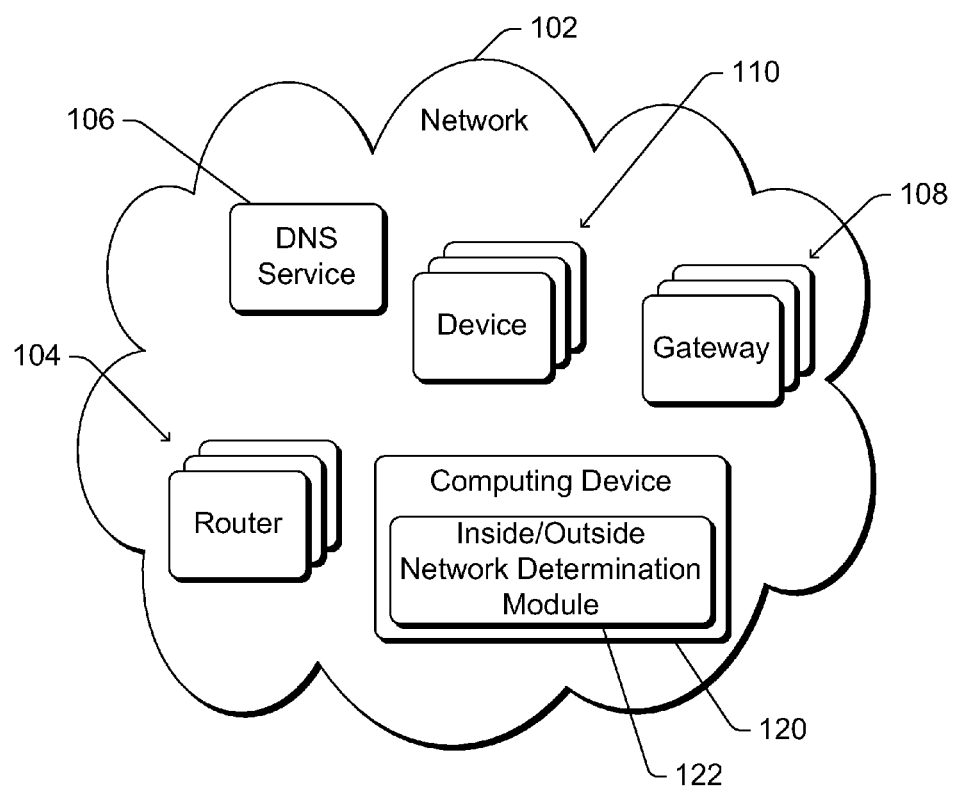
FIG. 1 illustrates an example system implementing the DNS-based determining whether a device is inside a network in accordance with one or more embodiments.

DNS-based determining whether a device is inside a network is discussed herein. A computing device generates a domain name system (DNS) query to resolve a particular name and sends the DNS query to a DNS service. If the computing device is inside a particular network (e.g., a corporate network), the computing device expects to receive a DNS response with a particular value, and further expects the DNS response to be digitally signed by a trusted authority. If the DNS response has the expected particular value and is digitally signed by the trusted authority, then the computing device determines that it is inside the particular network. However, if the DNS response does not have the expected particular value and/or is not digitally signed by the trusted authority, or if no DNS response is received, then the computing device determines that it is outside the particular network.

References are made herein to digital signatures and digital certificates. Although digital signatures and digital certificates are well-known to those skilled in the art, a brief overview of such is included here to assist the reader. Digital signatures and digital certificates are oftentimes generated using public key cryptography. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed. A digital certificate can be created that includes an identifier of an entity and the public key for that entity, and the digital certificate digitally signed using the private key of that entity in order to bind the identifier of the entity to the public key for that entity.

Digital signatures and digital certificates can alternatively be generated using symmetric key cryptography. In symmetric key cryptography a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key). A digital certificate can be created that includes an identifier of the entity and the public key for that entity, and the digital certificate digitally signed (e.g., by the trusted third party) in order to bind the identifier of the entity to the public key for that entity.

FIG. 1 illustrates an example system 100 implementing the DNS-based determining whether a device is inside a network in accordance with one or more embodiments. System 100 includes a network 102, which is one or more devices coupled together via a communication network. The communication network can include wired and/or wireless communications, and allows various ones of the devices in network 102 to communicate with various other devices in network 102. The communication network can be, for example, a local area network (LAN), a public telephone network, a private telephone network, other public and/or proprietary networks, combinations thereof, and so forth.

Network 102 includes various devices, including one or more routers 104, one or more devices implementing a DNS service 106, one or more gateways 108, and one or more other devices 110. Routers 104 route data packets or other information among the various devices of network 102. DNS service 106 resolves names to network addresses, as discussed in more detail below. DNS service 106 is typically implemented on one or more servers, although DNS service 106 can alternatively be implemented on other types of devices. Gateways 108 manage connecting network 102 to other networks (e.g., the Internet) or other devices outside network 102. Communications from devices inside network 102 to devices outside network 102, as well as communications from devices outside network 102 to devices inside network 102, are managed by gateway 108.

Devices 110 can be a variety of different types of devices, including computing devices such as a desktop computer, a server computer, a laptop or netbook computer, a tablet or notepad computer, a mobile station, a database or other storage device, an entertainment appliance, a set-top box communicatively coupled to a display device, a television or other display device, a cellular or other wireless phone, a game console, an automotive computer, and so forth. Devices 110 can also be various types of input devices, such as a scanner, a camera or other image capture device, and so forth. Devices 110 can also be various types of output devices, such as printers, facsimile machines, projectors or other display devices, and so forth.

Typically network 102 includes multiple devices, including at least one router 104, at least one device implementing at least part of DNS service 106, at least one gateway 108, and at least one device 110. However, it should be noted that network 102 can include any number of routers 104, any number of devices implementing at least part of DNS service 106, any number of gateways 108, and any number of devices 110. It should also be noted that not all such devices need be included in a network (e.g., no devices 110 may be included in a network). Additionally, it should be noted that one or more of such devices of network 102 can be combined into a single device. For example, a single device may provide the functionality of a router 104 and a gateway 108.

In example system 100, network 102 also includes a computing device 120 having an inside/outside network determination module 122. Computing device 120 can also be one of devices 110. Computing device 120 can be a variety of different types of computing devices, such as a desktop computer, a server computer, a laptop or netbook computer, a tablet or notepad computer, a mobile station, a database or other storage device, an entertainment appliance, a set-top box communicatively coupled to a display device, a television or other display device, a cellular or other wireless phone, a game console, an automotive computer, and so forth. Computing device 120 is oftentimes a mobile computing device that can be easily moved to different locations inside network 102, as well as easily moved between locations inside network 102 and locations outside network 102, such as a cellular or other wireless phone, a laptop or notepad computer, and so forth. Thus, network 102 can include computing device 120 at times (when computing device 120 is inside network 102), and not include computing device 120 at other times (when computing device 120 is outside network 102). Although a single computing device 120 is illustrated in system 100, it should be noted that multiple computing devices 120 of the same or different types of devices can be included in network 102.

Devices included in network 102 are configured to communicate with one another via the communication network. This configuration of a device can be performed when the device is added to network 102, and can also be performed at various times after the device is already included as part of network 102. Gateway 108 permits communication between devices included in network 102 and devices that are not included in network 102 based on particular policies and/or rules. The particular policies and/or rules followed by gateway 108 can vary, based on the owner and/or designer of network 102, an administrator of network 102, and so forth.

A computing device, such as computing device 120, communicates with other devices in network 102 by connecting to network 102. Connecting to network 102 refers to establishing a communication link between the computing device and network 102. Establishing the communication link includes one or more of obtaining a network address for the computing device (e.g., from a dynamic host configuration protocol (DHCP) server of network 102), authenticating the computing device or a user of the computing device to a domain controller of network 102 (e.g., using a user name and password, using a digital certificate, etc.), negotiating a protocol with a device included as part of network 102 (e.g., with a router 104 or gateway 108), establishing a secure (e.g., encryption) communication channel with a device included as part of network 102 (e.g., gateway 108), and so forth.

Establishing of a communication link between the computing device and network 102 can be initiated by the computing device or another device (e.g., a device included as part of network 102). Once the communication link is established, the computing device can communicate with other devices in network 102 (subject to any access control policies in place in network 102).

A device, such as computing device 120, can be referred to as being inside a network or outside a network. A device that is inside (also referred to as internal to) a network is a device that is included in the network and thus is able to communicate with other devices included in that network without having to access devices outside that network. Thus, for example, router 104, gateway 108, device 112, and devices implementing service 106 in system 100 are inside network 102 and are configured to communicate with one another via the communication network of network 102 without accessing devices outside network 102. Devices inside network 102 can communicate with other devices that are not inside network 102 by way of gateway 108. It should also be noted that although devices inside network 102 can communicate with one another via the communication network, various access control restrictions on which (or the manner in which) devices inside network 102 can access which other devices inside network 102 can be implemented.

A device that is outside (also referred to as external to) a network is a device that is not inside that network. Such a device can communicate with devices inside that network by way of a gateway of that network. Thus, for example, router 104, gateway 108, device 112, and devices implementing service 106 can receive communications from (and send communications to) devices outside network 102 via gateway 108, subject to the policies and/or rules used by gateway 108.

Which devices are included in network 102 can be defined in different manners, and can be based at least in part on the desires of an entity implementing network 102 and/or an administrator of network 102. In one or more embodiments, network 102 is defined by the devices served by DNS service 106. Devices inside network 102 submit DNS queries to, and receive DNS responses from, DNS service 106. A device outside network 102 is unable to access DNS service 106 (e.g., the policies and/or rules used by gateway 108 prevent the device from accessing DNS service 106).

In one or more other embodiments, network 102 is defined by the devices that are able to access one another without communications passing through a firewall (e.g., implemented by gateway 108 or another device) or accessing the Internet. Devices inside network 102 are those devices that can access one another (subject to any access control policies in place in network 102) without communications passing through the firewall or accessing the Internet. Devices that communicate with devices inside network 102 by way of the firewall or Internet are outside network 102.

Additionally, in one or more embodiments network 102 is a network that is administered by or for a particular business entity (e.g., a particular company, a particular division or unit of a company, etc.), and thus is referred to as a corporate network. Alternatively, network 102 can be other types of networks, such as a home network, an educational network, a gaming network, and so forth.

In the example of system 100, computing device 120 is inside network 102. However, situations can arise in which computing device 120 becomes outside the network. For example, computing device 120 can be moved to a different location at which computing device 120 is unable to establish a communication link with network 102 in a manner that would make computing device 120 inside network 102. It should be noted that, throughout its use, computing device 120 can be moved between being inside network 102 and outside network 102 numerous times.

Figure 2:
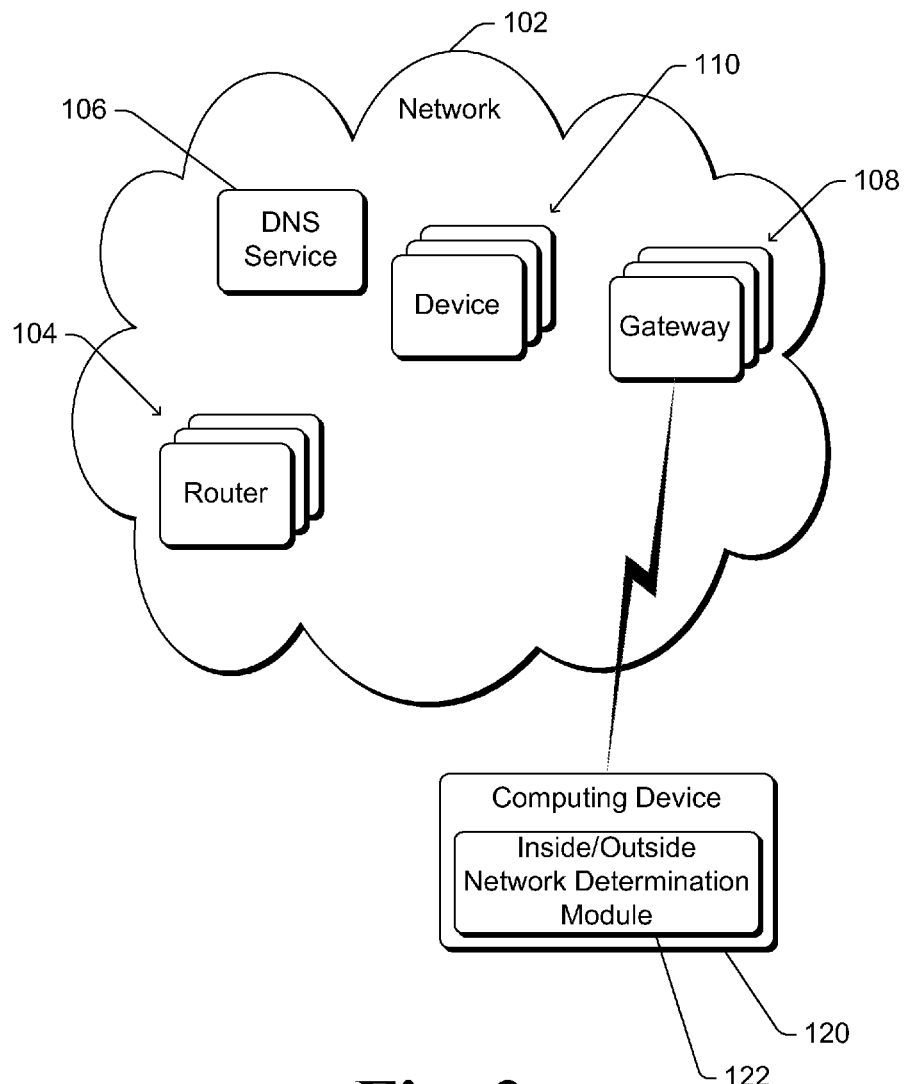
FIG. 2 illustrates another example system implementing the DNS-based determining whether a device is inside a network in accordance with one or more embodiments.

FIG. 2 illustrates another example system 200 implementing the DNS-based determining whether a device is inside a network in accordance with one or more embodiments. System 200 is similar to system 100 of FIG. 1, including network 102, one or more routers 104, a DNS service 106, one or more gateways 108, and one or more other devices 110. System 200 also includes computing device 120. Although a single computing device 120 is illustrated in system 200, it should be noted that multiple computing devices 120 of the same or different types of devices can be included in system 200.

Computing device 120 of FIG. 2 is computing device 120 of FIG. 1. In FIG. 1, computing device 120 is included inside network 102. However, in FIG. 2 computing device 120 is outside network 102 and establishes a communication link with network 102 via gateway 108. A communication link can be established between computing device 120 and gateway 108 via a variety of other devices or communication networks, such as via the Internet, via a cellular or other public network, and so forth.

Computing device 120 can operate in different manners based on whether computing device 120 determines it is inside network 102 or outside network 102. For example, computing device 120 may determine whether to use encrypted communication based on whether computing device 120 is inside network 102, computing device 120 may enable or disable certain functionality based on whether computing device 120 is inside network 102, computing device 120 may permit or deny access to files stored on computing device 120 based on whether computing device 120 is inside network 102, and so forth. Computing device 120 can optionally make various other determinations or perform various other operations or functions based on whether computing device 120 is inside network 102, e.g., based on the design of computing device 120 and/or software or firmware running on computing device 120.

Computing device 120 includes inside/outside network determination module 122, which determines whether computing device 120 is inside network 102 or outside network 102 at any particular time. To perform this determination, inside/outside network determination module 122 leverages a DNS system and DNS service 106. A DNS system allows devices or services to be identified using a domain name (e.g., included in a Uniform Resource Locator (URL)) that is typically more easily used and referred to by users than network addresses (such as Internet Protocol (IP) v4 or v6 addresses). One or more DNS service 106 operate to map a particular name, such as a domain name, to a corresponding network address that can be used by computing device 120 to access a particular device or service. This mapping of a name to a corresponding network address is also referred to as DNS resolution.

In one or more embodiments, the DNS system discussed herein refers to a system in compliance with the well-known DNS protocol (e.g., as discussed in Network Working Group Request for Comments 1034 (November 1987) and in Network Working Group Request for Comments 1035 (November 1987)). However, it should be noted that the DNS-based determining whether a device is inside a network techniques discussed herein can be used in conjunction with other systems or protocols that perform similar functionality.

DNS service 106 also supports various security functionality, securing various information or data that can be provided by DNS service 106. This functionality includes supporting digital signatures for DNS responses returned by DNS service 106 in response to DNS queries. A digital signature for a DNS response can be generated by the DNS service 106 itself (e.g., using a private key of the DNS service) or alternatively can be generated by another device or component (e.g., using a private key of another entity trusted by DNS service 106).

In one or more embodiments, DNS service 106 supports the well-known DNS Security Extensions (DNSSEC) protocol. Additional information regarding the DNSSEC protocol can be found in Network Working Group Request for Comments 4033 (March 2005), Network Working Group Request for Comments 4034 (March 2005), and Network Working Group Request for Comments 4035 (March 2005).

Generally, inside/outside network determination module 122 determines whether computing device 120 is inside network 102 or outside network 102 by sending a DNS query to a DNS service. This DNS query is a request to resolve a particular name (e.g., domain name or other name). If computing device 120 is inside network 102 then the DNS query is routed to DNS service 106. However, if computing device 120 is outside network 102 then the DNS query is routed to another DNS service (not shown), such as a publicly available DNS service on the Internet. Inside/outside network determination module 122 can be configured with the network address of the DNS service to which the DNS query is to be sent, or can otherwise obtain the network address of the DNS service (e.g., from gateway 108). Alternatively, module 122 can forward a DNS query to another module or service, such as a local DNS resolver, which knows (or obtains) the network address of the DNS service and forwards the DNS query to that DNS service on behalf of module 122.

DNS service 106 maintains a record of, or otherwise has access to a record of, the particular value to which that particular name in the DNS query is mapped. The particular name is typically mapped to one particular value, although can alternatively be mapped to multiple different particular values. The mapping for this particular name is typically maintained secretly or in private by DNS service 106 and is not exposed to DNS services outside network 102. For example, the mapping for this particular name is not registered on the Internet or with other DNS services outside network 102. Inside/outside network determination module 122, however, also knows the mapping for this particular name. Inside/outside network determination module 122 can be configured with, or otherwise obtain, the mapping for this particular name.

The DNS service returns a DNS response to inside/outside network determination module 122. If the DNS response is generated or returned by DNS service 106, then the DNS response includes the particular value to which the particular name in the DNS query is mapped. However, if the DNS response is generated or returned by a DNS service outside network 102, then the DNS response includes an indication that the particular name in the DNS query cannot be mapped (or includes an incorrect mapping), such as including an indication of a "DNS name does not exist" error. Alternatively, if computing device 120 is outside network 102, no DNS service outside network 102 may return a response, so inside/outside network determination module 122 receives no DNS response.

Additionally, the DNS response that DNS service 106 returns is digitally signed by a trusted authority. The DNS response being digitally signed by a trusted authority can refer to the entire DNS response being digitally signed by a trusted authority, or alternatively part of the DNS response (e.g., the particular value to which the particular name in the DNS query is mapped) being digitally signed by a trusted authority. Inside/outside network determination module 122 can authenticate, or have authenticated, the digital signature in a variety of different manners (e.g., by using a public key of the trusted authority). The trusted authority is an entity that is trusted by computing device 120 and/or inside/outside network determination module 122. The trusted authority can be included as part of network 102, or alternatively be outside network 102. The trusted authority can be the DNS service 106 that generates or returns the DNS response. Alternatively, the trusted authority can be another entity, such as a root certificate authority for network 102. If the DNS response is generated or returned by a DNS service 106, then the DNS response will be digitally signed by a trusted authority. However, if the DNS response is generated or returned by a DNS service outside network 102, then the DNS response will not be digitally signed by a trusted authority.

Inside/outside network determination module 122 uses the DNS response (or lack thereof) to determine whether computing device 120 is inside network 102. If computing device 120 is inside network 102, then the DNS response will include the particular value to which the particular name in the DNS query is mapped and the DNS response will also be digitally signed by a trusted authority. Module 122 knows the particular value to which the particular name in the DNS query should be mapped, and this is also referred to as the expected value (the value expected by module 122 to be included in the DNS response).

Thus, if the DNS response both includes the expected value and is digitally signed by a trusted authority, then inside/outside network determination module 122 determines that computing device 120 is inside network 102. However, if the DNS response does not include the expected value and/or is not digitally signed by a trusted authority, or if no DNS response is received, then inside/outside network determination module 122 determines that computing device 120 is outside network 102.

In alternate embodiments, inside/outside network determination module 122 determines that computing device 120 is inside network 102 if the DNS response includes the expected value regardless of whether the DNS response is digitally signed by a trusted authority. In other alternate embodiments, inside/outside network determination module 122 determines that computing device 120 is inside network 102 if the DNS response is digitally signed by a trusted authority regardless of whether the DNS response includes the expected value.

Figure 3:
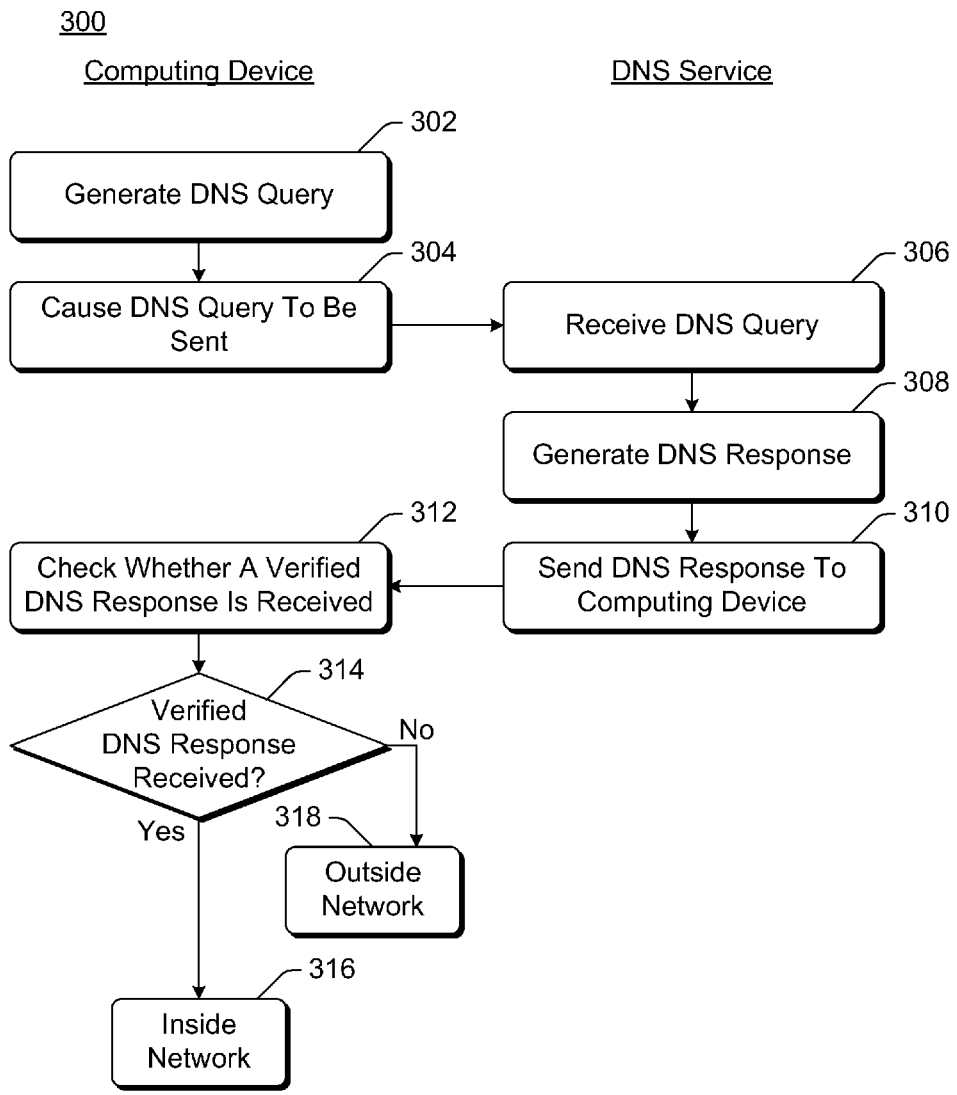
FIG. 3 is a flowchart illustrating an example process for a computing device determining, based on DNS, whether it is inside a particular network in accordance with one or more embodiments.

FIG. 3 is a flowchart illustrating an example process 300 for a computing device determining, based on DNS, whether it is inside a particular network in accordance with one or more embodiments. Process 300 can be implemented in software, firmware, hardware, or combinations thereof. Acts of process 300 illustrated on the left-hand side of FIG. 3 are carried out by a computing device, such as computing device 120 of FIGS. 1 and 2, and typically by an inside/outside network determination module on that computing device (such as module 122 of FIG. 1). Acts of process 300 illustrated on the right-hand side of FIG. 3 are carried out by a DNS service, such as DNS service 106 of FIGS. 1 and 2. Process 300 is shown as a set of acts and is not limited to the order shown for performing the operations of the various acts. Process 300 is an example process for a computing device determining whether it is inside a particular network; additional discussions of a computing device determining whether it is inside a particular network are included herein with reference to different figures.

In process 300, the computing device generates a DNS query (act 302). This DNS query is a query to resolve a particular name, and the computing device expects a particular value in return if the computing device is inside a particular network. This particular name can be a URL or alternatively another name. For example, this particular name can take the form "insideoutside.<domain-name>", where "insideoutside" identifies the DNS query as a query being used to determine whether the computing device is inside a particular network, and "<domain-name>" identifies the particular network.

The inside/outside network determination module causes the DNS query to be sent to a DNS service (act 304). The inside/outside network determination module can cause the DNS query to be sent by sending the DNS query, or alternatively causing another module or component to send the DNS query.

The DNS query is received by a DNS service (act 306). The DNS service that receives the DNS query can vary based on the location of the computing device, such as based on whether the computing device is inside the particular network.

The DNS service generates a DNS response to the received DNS query (act 308). In one or more embodiments, if the DNS service is inside the particular network then the DNS response includes the particular value that is expected by the computing device, and is digitally signed by a trusted authority. However, if the DNS service is outside the particular network then the DNS response does not include the particular value and/or is not digitally signed by a trusted authority.

The DNS service sends the DNS response to the computing device (act 310). The DNS service can send a DNS response or alternatively cause another device or component to send the DNS response. Alternatively, if the DNS service is outside the network, then the DNS service may generate and return no DNS response in acts 308 and 310.

The inside/outside network determination module checks whether a verified DNS response is received (act 312). Situations can arise in which the computing device including the inside/outside network determination module is outside the network, and thus receives no DNS response, or receives a DNS response that is not verified. If a DNS response is received, the inside/outside network determination module can cause the DNS response to be received by receiving the DNS response itself, or alternatively by invoking or causing another module or component to receive the DNS response. Additionally, if a DNS response is received, then the DNS response is verified in act 312. The DNS response can be verified in different manners, such as by checking whether the DNS response includes the expected value for the particular name that was included in the DNS query and/or whether the DNS response is digitally signed by a trusted authority.

Process 300 proceeds based on a check of whether a verified DNS response is received (act 314). If a verified DNS response is received, then the computing device is determined to be inside the particular network (act 316).

However, if no DNS response is received within a threshold amount of time, then the inside/outside network determination module times out and the computing device is determined to be outside the particular network (act 318). This threshold amount of time can vary (e.g., 1 second, 5 seconds, etc.). Additionally, if a DNS response is received but the DNS response is not verified, then the computing device is determined to be outside the particular network (act 318).

The determination of whether the computing device is inside the particular network or outside the particular network can then be forwarded to or otherwise made available to various other components or modules of the computing device. These other components or modules can then proceed operate in various manners based on whether the computing device is inside the particular network or outside the particular network.

Process 300 can be repeated at particular intervals, including regular or irregular intervals. For example, process 300 can be performed approximately every five minutes, approximately hourly, and so forth. By way of another example, process 300 can be performed in response to particular events, such as in response to the computing device resuming operation from a reduced power mode (e.g., from a sleep or hibernate mode), in response to movement of the computing device by greater than a threshold amount (e.g., 100 yards, 1 mile, and so forth) being detected (e.g., by a global positioning system (GPS) of the computing device), in response to arrival or removal of a network interface of the computing device (e.g., a network interface of the computing device being enabled), in response to the computing device determining the computing device is within range of a new wireless network or no longer within range of a wireless network it was previously within range of, and so forth.

Figure 4:
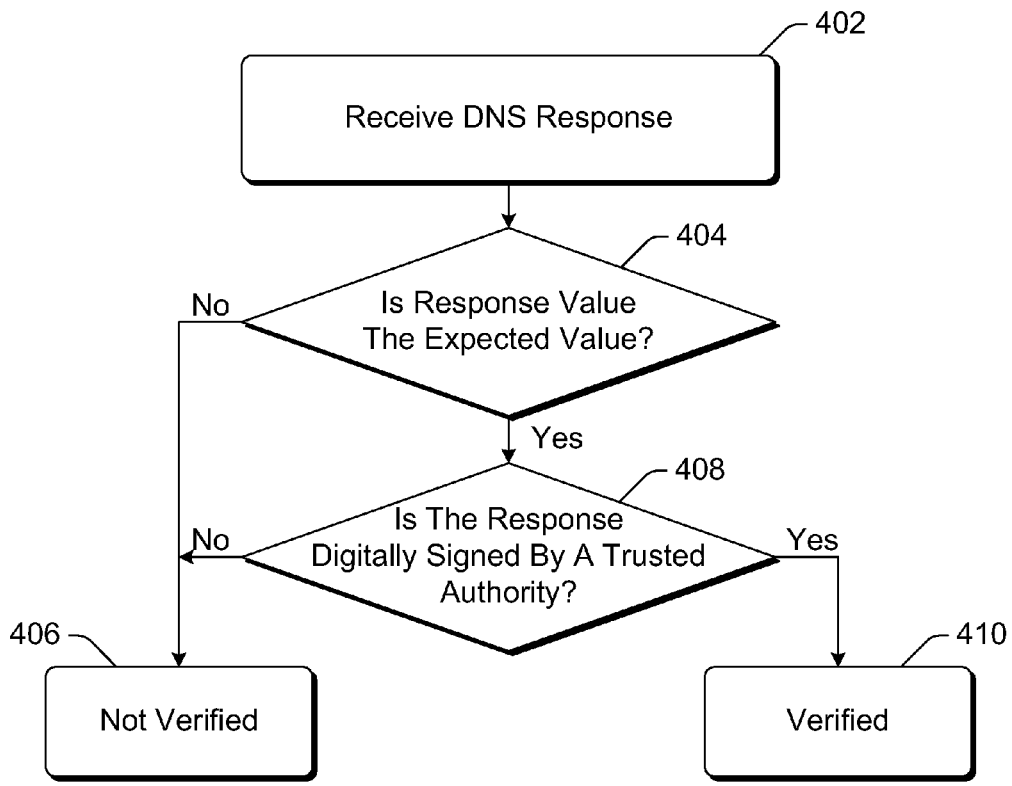
FIG. 4 is a flowchart illustrating an example process for a computing device verifying a DNS response in accordance with one or more embodiments.

FIG. 4 is a flowchart illustrating an example process 400 for a computing device verifying a DNS response in accordance with one or more embodiments. Process 400 can be implemented in software, firmware, hardware, or combinations thereof. Process 400 is carried out by a computing device, such as computing device 120 of FIGS. 1 and 2, and typically by an inside/outside network determination module on that computing device (such as module 122 of FIGS. 1 and 2). Process 400 can be, for example, acts 312 and 314 of FIG. 3. Process 400 is shown as a set of acts and is not limited to the order shown for performing the operations of the various acts. Process 400 is an example process for a computing device verifying a DNS response; additional discussions of a computing device verifying a DNS response are included herein with reference to different figures.

In process 400, a DNS response is received (act 402). The DNS response is received from a DNS service (or alternatively a DNS cache as discussed in more detail below) or another module or component of the device implementing process 400 (e.g., another module or component that the inside/outside network determination module invoked or caused to receive the DNS response).

A check is made as to whether the DNS response includes a value that is an expected value (act 404). As discussed above, if the computing device is part of a particular network then the DNS response will include the expected value for a particular name in a DNS query for which the DNS response is a response. Additionally, multiple different expected values may be used in act 404, and the check made as to whether the DNS response includes one or more of those multiple different expected values.

If the DNS response does not include the expected value then the DNS response is unverified or is not verified (act 406).

However, if the DNS response does include the expected value then a check is made as to whether the DNS response is digitally signed by a trusted authority (act 408). This trusted authority can be the DNS service or another trusted entity as discussed above.

If the DNS response is not digitally signed by a trusted authority then the DNS response is unverified or is not verified (act 406). However, if the DNS response is digitally signed by a trusted authority then the DNS response is verified (act 410).

Returning to FIGS. 1 and 2, in one or more embodiments computing device 120 maintains a DNS cache. This DNS cache is a local copy of mappings of particular names to particular values that have been resolved by a DNS service and returned to computing device 120. Thus, situations can arise in which inside/outside network determination module 122 sends a DNS query to resolve a particular name and a mapping for that particular name is included in the DNS cache. In such situations, inside/outside network determination module 122 receives a DNS response based on the mappings in the DNS cache rather than from a DNS service. For example, referring to FIG. 3, the DNS query in act 304 would be sent to the DNS cache and the DNS response in act 312 received from the DNS cache.

In one or more embodiments, computing device 120 is configured to avoid situations in which inside/outside network determination module 122 makes an incorrect determination of whether computing device 120 is inside a particular network due to a DNS response based on mappings in the DNS cache. Such situations can be avoided in different manners.

In one or more embodiments, each mapping in the DNS cache has an associated time to live (TTL), which can be the same or different for different mappings in the DNS cache. After the time to live for a mapping in the DNS cache has expired, a DNS query to resolve a particular name included in the expired mapping is forwarded to a DNS service to resolve rather than returning a DNS response based solely on the mapping in the DNS cache. The time to live for a mapping for a particular name used to determine whether computing device 120 is inside a particular network is set to a small value (e.g., a value of zero, a value less than five minutes, etc.). Thus, by having a short time to live for such mappings in the DNS cache, inside/outside network determination module 122 would not rely on incorrect outdated data in the DNS cache for too long a period of time.

Alternatively, the DNS cache can maintain no mappings for particular names used to determine whether computing device 120 is inside a particular network, and a DNS response to a DNS query including such a mapping is not maintained in the DNS cache. This can also be viewed as mappings for particular names use to determine whether computing device 120 is inside a particular network having a time to live of zero. For example, the DNS cache may maintain no mappings having the format "insideoutside.<domain-name>". Thus, by having no such mappings in the DNS cache, inside/outside network determination module 122 would not rely on incorrect data in the DNS cache.

It should be noted that although a single network 102 is illustrated, the determining whether a device is inside a network techniques discussed herein can be used with multiple different networks. Computing device 120 can be configured with, or otherwise obtain, an indication of trusted authorities (and optionally network address of DNS services) for each of a variety of different networks. Inside/outside network determination module 122 can thus readily determine, at any particular time, whether computing device 120 is inside or outside any one of those different networks.

Additionally, it should be noted that although inside/outside network determination module 122 is shown as being part of computing device 120, alternatively various functionality of inside/outside network determination module 122 can be implemented on other devices. For example, computing device 120 can communicate with one or more other devices or services, which can be part of network 102 or another network, that can perform various aspects of the determining whether a device is inside a network techniques discussed herein.

Thus, the DNS-based determining whether a device is inside a network techniques discussed herein allow a computing device to accurately and reliably determine whether the computing device is inside a particular network at any particular time. By leveraging the DNS system, the DNS-based determining whether a device is inside a network techniques discussed herein use an existing reliable system for making the determination. The DNS system is already operating as a reliable system, providing replication, backup, and so forth as appropriate to maintain a high degree of availability of the DNS functionality. Thus, an additional reliable system with a high degree of availability need not be built and maintained in order to implement the DNS-based determining whether a device is inside a network techniques discussed herein.

Furthermore, the DNS-based determining whether a device is inside a network techniques discussed herein operate in various different types of network deployments. For example, the DNS-based determining whether a device is inside a network techniques discussed herein can be used with Internet Protocol (IP) version 4 (IPv4) network addresses, IP version 6 (IPv6) network addresses, Intra-Site Automatic Tunnel Addressing Protocol (ISATAP) addresses and mechanisms, other protocols and/or mechanisms, combinations thereof, and so forth.

The DNS-based determining whether a device is inside a network techniques discussed herein support a variety of different usage scenarios. For example, a computing device can operate in an "always on" access mode in which the computing device maintains connectivity to a particular network (e.g., a corporate network) despite being moved to different locations varying between inside the particular network and outside the particular network. The computing device can continue operation, determining whether the computing device is inside or outside the network at any particular time, and operating in different manners as appropriate based on this determination.

Figure 5:
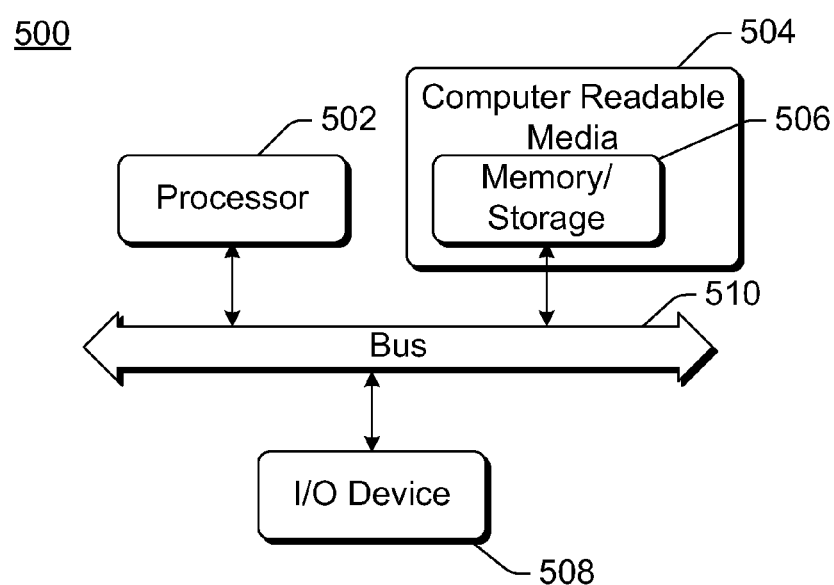
FIG. 5 illustrates an example computing device that can be configured to implement the DNS-based determining whether a device is inside a network in accordance with one or more embodiments.

FIG. 5 illustrates an example computing device 500 that can be configured to implement the DNS-based determining whether a device is inside a network in accordance with one or more embodiments. Computing device 500 can be, for example, computing device 120 of FIGS. 1 and 2, or one or more of a router 104, DNS service 106, gateway 108, and/or device 110 of FIGS. 1 and 2.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, applications, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the DNS-based determining whether a device is inside a network techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   generating a domain name system (DNS) query;
   causing the DNS query to be sent to a DNS service;
   checking whether a verified DNS response to the DNS query is received;
   determining that a computing device is located inside a particular network if the verified DNS response is received, wherein the network is defined by devices served by the DNS service, and wherein a device located inside the particular network is able to communicate with other devices included in the network without having to access devices outside the network; and
   determining that the computing device is located outside the particular network if the verified DNS response is not received.

2. A method as recited in claim 1, wherein the verified DNS response is received from the DNS service.

3. A method as recited in claim 1, wherein the particular network comprises a corporate network.

4. A method as recited in claim 1, wherein generating the DNS query includes generating the DNS query including a particular name, and wherein checking whether the verified DNS response is received comprises checking whether the DNS response has an expected value for the particular name.

5. A method as recited in claim 1, wherein the verified DNS response is received from a DNS service supporting a DNS Security Extensions (DNSSEC) protocol.

6. A method as recited in claim 1, wherein checking whether the verified DNS response is received comprises checking whether a received DNS response is digitally signed by a trusted authority.

7. A method as recited in claim 6, wherein the trusted authority is a root certificate authority for the particular network.

8. A method as recited in claim 1, wherein determining that the computing device is located outside the particular network comprises determining that the computing device is located outside the particular network if no DNS response to the DNS query is received within a threshold amount of time.

9. A method as recited in claim 1, wherein generating the DNS query includes generating the DNS query including a particular name, wherein the verified DNS response is received from a DNS cache including a mapping of the particular name to an expected value, and wherein the mapping in the DNS cache has a time to live of less than five minutes.

10. A method as recited in claim 1, further comprising repeating, at particular intervals, causing the DNS query to be sent, checking whether the verified DNS response is received, and determining that the computing device is located inside the particular network or located outside the particular network.

11. A method as recited in claim 1, further comprising repeating, in response to the computing device being moved by greater than a threshold amount, causing the DNS query to be sent, checking whether the verified DNS response is received, and determining that the computing device is located inside the particular network or located outside the particular network.

12. A method as recited in claim 1, wherein the generating the DNS query, the causing the DNS query to be sent and the checking whether the verified DNS response is received are performed by the computing device.

13. One or more computer storage media having stored thereon multiple instructions that, when executed by one or more processors of a computing device, cause the one or more processors to:
   receive a domain name system (DNS) response to a DNS query, wherein to receive the DNS response is to receive the DNS response from a DNS service;
   check whether the DNS response has an expected value;
   check whether the DNS response is digitally signed by a trusted authority; and
   determine that the computing device is verified and located inside a particular network if both the DNS response has the expected value and the DNS response is digitally signed by the trusted authority, wherein the network is defined by devices served by the DNS service, and wherein a device located inside the particular network is able to communicate with other devices included in the network without having to access devices outside the network, otherwise determine that the computing device is unverified and is located outside the particular network.

14. One or more computer storage media as recited in claim 13, wherein the DNS service comprises a DNS service supporting a DNS Security Extensions (DNSSEC) protocol.

15. One or more computer storage media as recited in claim 13, wherein the expected value is a value expected based on a mapping of a particular name in the DNS query to a particular value known by the computing device.

16. One or more computer storage media as recited in claim 13, wherein the particular network comprises a corporate network, and wherein the trusted authority is a root certificate authority for the corporate network.

17. One or more computer storage media as recited in claim 13, wherein to receive the DNS response is to receive the DNS response from a DNS cache including a mapping of a particular name in the DNS query to the expected value, and wherein the mapping in the DNS cache has a time to live of less than five minutes.

18. One or more computer storage media as recited in claim 13, wherein the trusted authority is trusted by the computing device.

19. A method in a computing device, the method comprising:
generating a domain name system (DNS) query that includes a particular name to be resolved;
causing the DNS query to be sent to a DNS service;
checking whether a verified DNS response to the DNS query is received from the DNS service by checking whether a received DNS response has an expected value for the particular name and checking whether the received DNS response is digitally signed by a root certificate authority for a corporate network, and determining that the received DNS response is the verified DNS response only if both the received DNS response has the expected value and the received DNS response is digitally signed by the root certificate authority, wherein the corporate network is defined by devices served by the DNS service;
determining that the computing device is located inside the corporate network if the verified DNS response is received, wherein a device located inside the corporate network is able to communicate with other devices included in the network without having to access devices outside the network; and
determining that the computing device is located outside the corporate network if the verified DNS response is not received.

20. A system comprising:
one or more processors;
one or more computer-readable media storing instructions which, when executed by the one or more processors, cause the one or more processors to perform operations comprising:
generating a domain name system (DNS) query;
causing the DNS query to be sent to a DNS service;
checking whether a verified DNS response to the DNS query is received;
determining that a computing device is located inside a particular network if the verified DNS response is received, wherein the network is defined by devices served by the DNS service, and wherein a device located inside the particular network is able to communicate with other devices included in the network without having to access devices outside the network; and
determining that the computing device is located outside the particular network if the verified DNS response is not received.

21. A system as recited in claim 20, wherein the verified DNS response is received from the DNS service.

22. A system as recited in claim 20, wherein the particular network comprises a corporate network.

23. A system as recited in claim 20, wherein generating the DNS query includes generating the DNS query including a particular name, and wherein checking whether the verified DNS response is received comprises checking whether the DNS response has an expected value for the particular name.

24. A system as recited in claim 20, wherein the verified DNS response is received from a DNS service supporting a DNS Security Extensions (DNSSEC) protocol.

25. A system as recited in claim 20, wherein checking whether the verified DNS response is received comprises checking whether a received DNS response is digitally signed by a trusted authority.

26. A system as recited in claim 25, wherein the trusted authority is a root certificate authority for the particular network.

27. A system as recited in claim 20, wherein determining that the computing device is located outside the particular network comprises determining that the computing device is located outside the particular network if no DNS response to the DNS query is received within a threshold amount of time.

28. A system as recited in claim 20, wherein generating the DNS query includes generating the DNS query including a particular name, wherein the verified DNS response is received from a DNS cache including a mapping of the particular name to an expected value, and wherein the mapping in the DNS cache has a time to live of less than five minutes.

29. A system as recited in claim 20, further comprising repeating, at particular intervals, causing the DNS query to be sent, checking whether the verified DNS response is received, and determining that the computing device is located inside the particular network or located outside the particular network.

30. A system as recited in claim 20, further comprising repeating, in response to the computing device being moved by greater than a threshold amount, causing the DNS query to be sent, checking whether the verified DNS response is received, and determining that the computing device is located inside the particular network or located outside the particular network.

31. A system as recited in claim 20, wherein the generating the DNS query, the causing the DNS query to be sent and the checking whether the verified DNS response is received are performed by the computing device.

* * * * *